Aug. 7, 1951  F. S. SINCLAIRE  2,563,497
MOTOR CONTROL FOR ROTARY TOOL MACHINES
Filed Aug. 5, 1947  3 Sheets-Sheet 1

INVENTOR.
Francis S. Sinclaire
BY
Kenyon & Kenyon
ATTORNEYS

Aug. 7, 1951　　　F. S. SINCLAIRE　　　2,563,497
MOTOR CONTROL FOR ROTARY TOOL MACHINES
Filed Aug. 5, 1947　　　　　　　　　　3 Sheets-Sheet 2

INVENTOR.
Francis S. Sinclaire
BY
Kenyon & Kenyon
ATTORNEYS

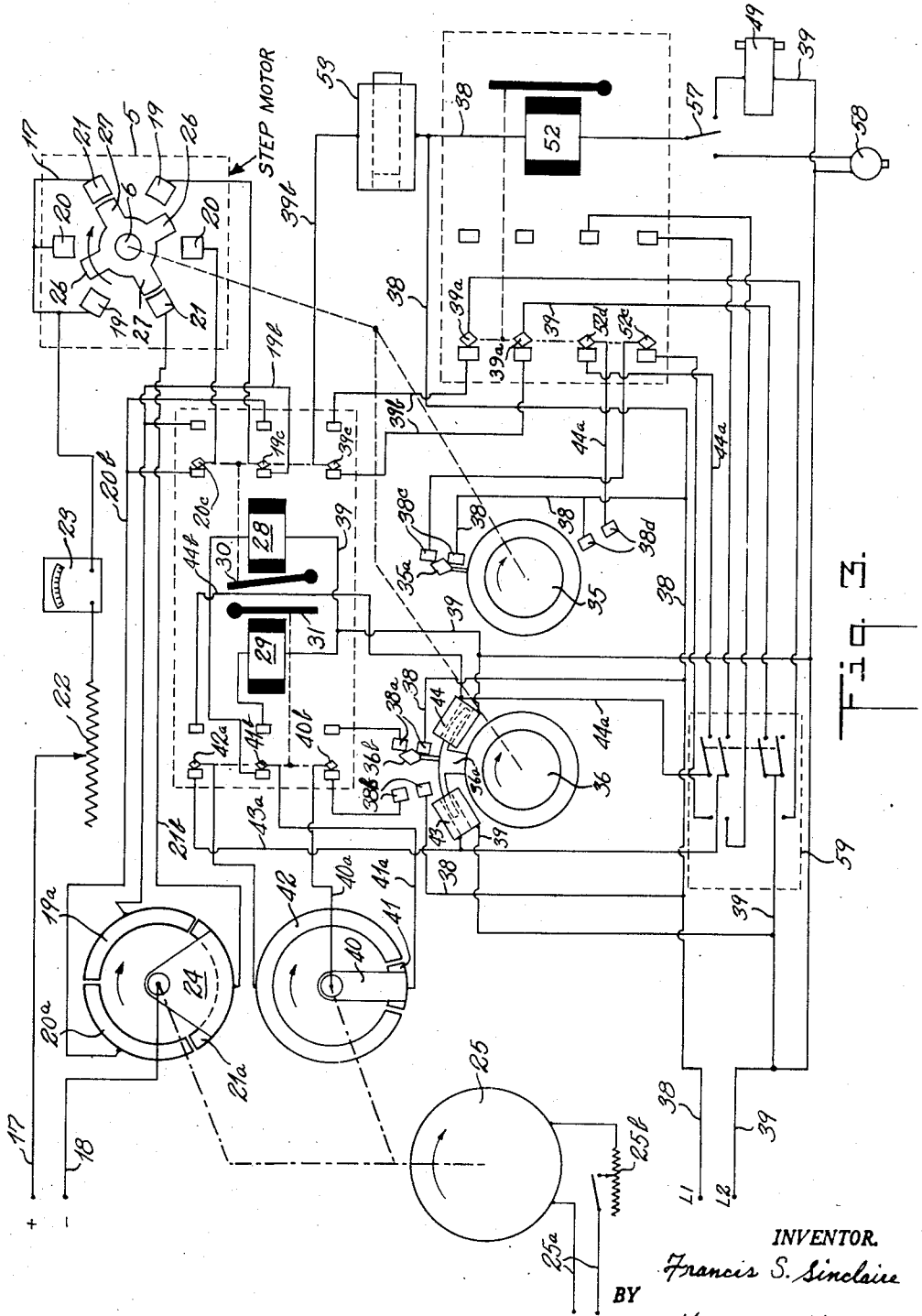

Patented Aug. 7, 1951

2,563,497

UNITED STATES PATENT OFFICE 2,563,497

MOTOR CONTROL FOR ROTARY TOOL MACHINES

Francis S. Sinclaire, Brooklyn, N. Y.

Application August 5, 1947, Serial No. 766,190

6 Claims. (Cl. 318—474)

1

This invention relates to an automatic reversing drive with torque control, particularly designed to provide a novel drive for a thread tapping machine that is fully automatic yet which has the sensitive feel or touch of an operator manually skilled in the precision tapping art. Such an operator feeds the tap manually and through skill and experience can feel when a long chip is formed which will interfere with forming a precision thread, whereupon the operator reverses the rotation to break the chip without damage to the thread, and then restarts the threading rotation while again feeling to make sure whether the chip is gone or another reversal is indicated. This skilled manual practice of the tapping art has never before been duplicated by an automatic machine, the present invention not only incorporating this skill into a fully automatic machine but actually improving on it since it eliminates any chance of operator fatigue with its attendant increased chance of tapping a poor thread.

A preliminary synopsis of certain outstanding characteristics and advantages of this invention, facilitates reading of the following disclosure of a specific example of one of several machines involving its principles. Outstandingly, this invention embraces the idea of powering a tap, or any other rotative tool or machine part whose operation involves similar problems, by means of a step motor or its equivalent, this having the advantage that its torque may be adjusted to a predetermined maximum and when this maximum is exceeded by excessive turning resistance, the motor immediately stalls and automatically reverses at least a little bit. This action occurs due to magnetic slippage preventing the motor's rotor from following its revolving magnetic field when the load becomes too great, and the rotor then seeking magnetic balance with the field with which it is out of phase upon slippage occurring. There are no friction drives or the like which wear can affect, the effect being positive and dependent only on the strength of the magnetic fields involved, so accuracy remains constant throughout the life of the machine. Advantage is taken of this phenomenon by providing a special switching system which reverses the motor circuits upon the automatic reversal, until the motor reverses a predetermined amount, when the system again connects the circuits for a continuance of forward operation. The phenomenon prevails during reverse and the switching system also operates then, so the tap, tool or machine part is automatically turned

2 one way or another with no more than the predetermined torque maximum, until it is again safe to proceed with the tapping or forward rotation, at which time uninterrupted forward motor rotation is resumed. Even the most skilled manual worker cannot duplicate the consistent touch delicacy provided in this fashion. Automatic arrangements are provided for keeping the step motor under control at all times. In addition, when used for tapping, there is a system selectively rendering the machine fully automatic or permitting its operator to have a handy manual control controlling the tap rotation and which does not hamper manual holding or arrangement of the work when this is desired. There are many other features included by the example disclosed by the following.

This example of using this drive for tapping purposes is illustrated by the accompanying drawings in which—

Fig. 3 is a wiring diagram; and

Figure 1:
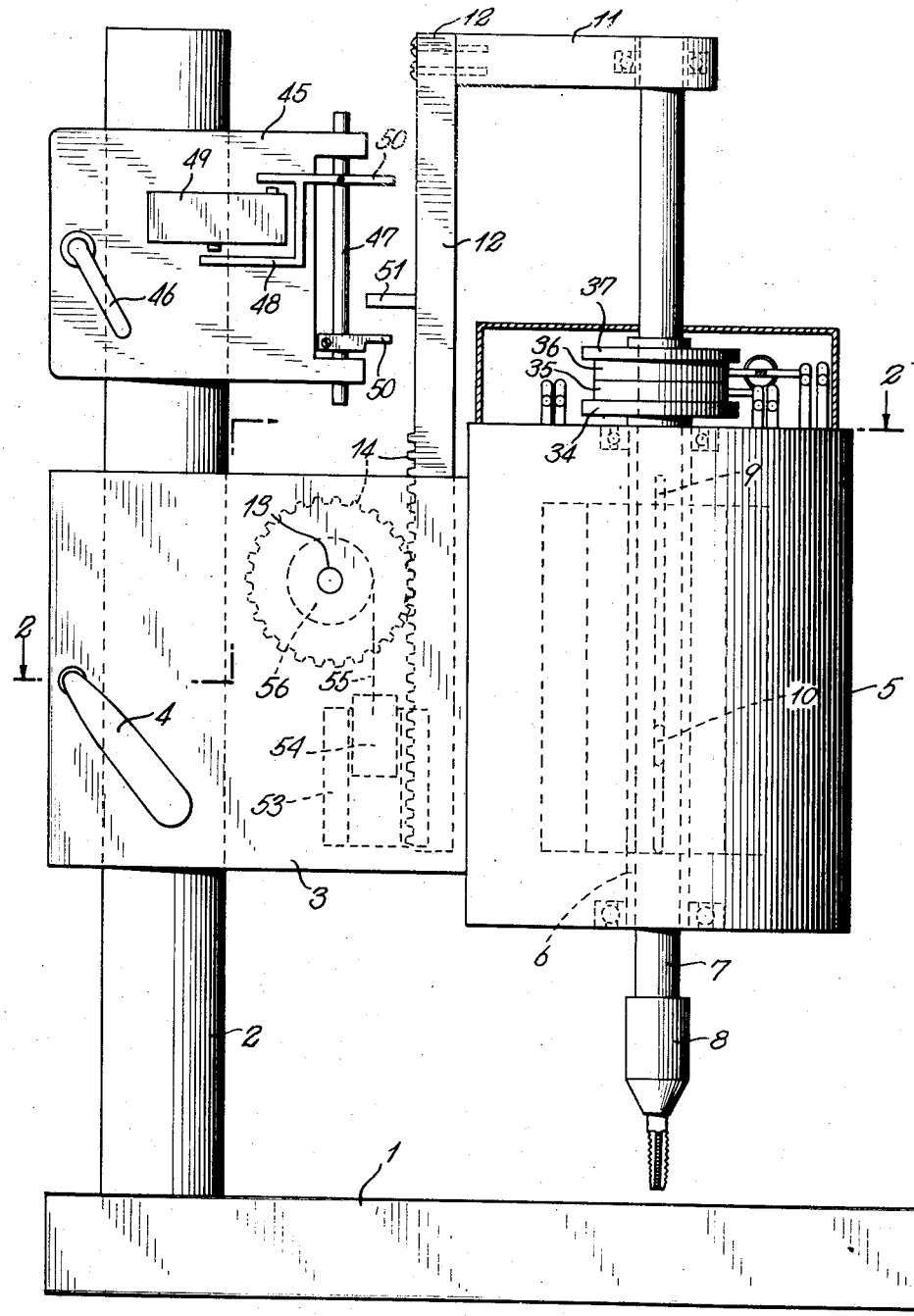
Fig. 1 is a side view of the machine.
Figure 2:
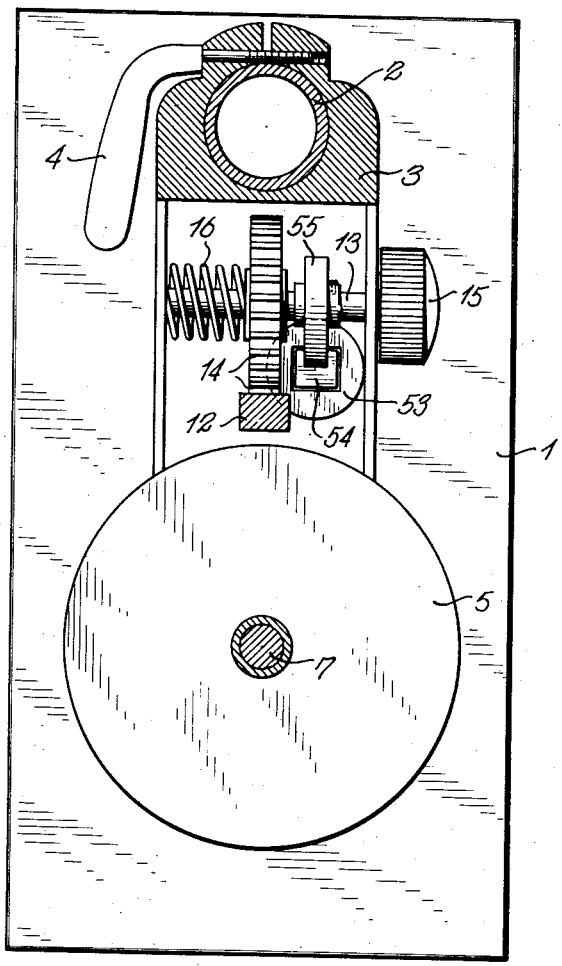
Fig. 2 is a cross section taken from the line 2—2 in Fig. 1.

More specifically, Figs. 1 and 2 show a base 1 for supporting the work to be tapped and from which a vertical column 2 rigidly rises. A bracket 3 rides this column 2 and is rigidly clamped to it by turning of a handle 4, and this bracket rigidly mounts a step motor 5.

The power shaft 6 of the motor 5 is hollow and coaxially carries a vertical reciprocative spindle 7 for the tap chuck 8, the shaft 6 and spindle 7 being rotatively interlocked by a long key-way 9 and sliding key 10. The upper end of the spindle 7 is rotatively carried by a cantilever 11 mounted by a post 12 vertically reciprocatively mounted by the bracket 3. A shaft 13 extends transversely through the bracket 3 and connects with the post 12 by way of rack and pinion gearing 14. One end of the shaft 13 projects beyond the outside of the bracket 3 and has a hand-knob 15 permitting turning of the shaft with consequent vertical movement of the spindle 7, the shaft having a torsion spring 16 supplying it rotative force regulated by the spring design to just slightly spring bias the post 12 upwardly. Therefore, with the motor 5 running, tapping may be effected by lightly twisting the knob 15 to feed the tap, which will, of course, be in the chuck 8, into the hole in the work, the screw action of the tap then taking up the feed.

Assuming the step motor 5 has its windings successively energized rotatively, it will rotate the chuck 8 and effect tapping of the work. By fixing its energizing amperage maximum it cannot exert more torque than the value predeterminedly so fixed, so the arrangement disclosed equals the feel of the skilled operator in the sense that the amperage may be set to produce the torque maximum beyond which the skilled operator would not go by feel. A new and unexpected result is involved in that the moment this torque is exceeded, instead of the motor merely stalling, it momentarily reverses itself. This follows from the fact that as its rotative pole pieces lag behind the rotative magnetic field and come to the stalling point, they immediately are attracted reversely by energization of the windings immediately behind the stalled pole pieces. The only rotative masses involved are those of the rotating pole pieces and power shaft of the motor 5, the chuck spindle 7, the chuck 8 and the tap itself. This total mass is very small by comparison to the power involved, so the moment the predetermined torque is exceeded the tap is almost immediately stopped and reversed. Obviously this reversal cannot be effected with more than the predetermined torque and if stalling occurs during reversal, the pole pieces and the power shaft of the motor 5 are similarly momentarily attracted forwardly.

Other motors than what might technically be called a step motor may have the advantages described above. For example the impulse motor having a wound armature (synchronous differential motor) and the synchronous follow-up motor (Selsyn motor) provide the same type of function. A step motor with its wound stationary field pole pieces and its simple solid rotating pole pieces, usually has the advantages of low-cost, simplicity and rotating parts having less mass, as compared to other types providing comparable torque.

A fully automatic machine introduces the problem of providing means for controlling the antics of the step motor. It is desirable to control the amount of reverse rotation and a necessity that the motor armature be phased with its successively rotatively energized field windings. Furthermore, a system must be provided for effecting these advantages and those already described, when the motor 5 is reversed to get the tap out of the tapped hole. The present invention solves all these problems.

Referring now to the wiring diagram in Fig. 3, D. C. power lines 17 and 18 provide the power for the motor 5. This motor has three pairs of field windings, or solenoids, and field pole pieces, numbered 19, 20 and 21, and although not shown the windings' inner ends are electrically interconnected in each pair. The line 17 connects with one outer end of the windings of all three pairs and this line includes a rheostat 22 and an amperage indicator 23, preferably calibrated in terms of torque or tap sizes to permit the tapping machine operator to set the machine properly for the maximum torque permissible for any given size of tap, or for other desired torque. However, the main idea is to provide the operator with a means for controlling the maximum torque that the motor 5 can exert on the tap without stalling.

The other power line 18 connects with a brush 24 rotated by a motor 25 over segments 19a, 20a and 21a with each segment connecting with the other end of the similarly numbered motor field winding pair of the motor 5, through lines 19b, 20b and 21b respectively. The motor 25 is powered by power lines 25a through a rheostat 25b and is of the variable speed type, the setting of the rheostat 25b determining the rotating speed of the successive rotative energization of the motor field winding pairs and, therefore, the speed of the power shaft 6 of the motor 5. In other words this rheostat 25b controls the tapping speed. Control elements not shown in Fig. 1 or Fig. 2 may be mounted in a convenient control box or unit either separate from or attached to the machine pictured in Fig. 1.

It is now possible to better visualize the new and unexpected results previously described. Since the motor 5 has three pairs of field windings it may conveniently be provided with two pairs of rotating pole-pieces 26 and 27, forming a cross pole-piece armature which is attached to the power shaft 6. The wound and plain pole-pieces must be relatively spaced for rotation of the rotative set by successive powering of the wound set. The motor 25 need be only big enough to rotate the brush 24, and as this brush rotates it properly energizes the various motor field winding pairs so they magnetically alternately drag the armature pole-piece pairs synchronously along with the rotation of the brush 24, the torque produced by the step motor depending upon the current provided it by the current quantity adjuster in the form of the rheostat 22. When the chuck exerts a reaction exceeding this torque, the pole-piece pairs immediately stall and then, the brush 24 continuing to turn and therefore energizing the field winding pair immediately behind the respectively closest stalled pole-piece pair, the armature flips backwardly by the reverse magnetic drag. For example, if the shaft 6 stalls when the pole-pieces 27 are opposite the field pole-pieces 21, the immediately subsequent energization of the field pole-pieces 19 attracts the pole-pieces 26 and momentarily reverses the shaft 6. This had the advantages and introduces the problems previously described.

Either the brush 24 or the segments 19a, 20a and 21a are made of electrically resistive material. The brush 24 passing over these segments then acts as a variable resistor to gradually increase and then gradually decrease the current flowing to the motor pole pairs 19, 20 and 21. This causes the step motor to turn smoothly and eliminates jumping from one pole pair to the next.

Continuing with the wiring diagram, the motor field winding pair 21 is directly connected to its commutator segment 21a by its line 21b, but the other sets are connected to their segments through a pole changer in the form of contactors 19c and 20c which are part of a relay having a solenoid 28 which, when energized shifts the contactor 20c from the line 20b to the line 19b, while shifting the contactor 19c from the line 19b to the line 20b. A second solenoid 29, also a part of this relay, returns the contactors 19c and 20c to their similarly numbered lines. These solenoids, and others mentioned hereinafter, may have solid plunger type armatures or may have fixed pole pieces and clapper type armatures.

Figure 4:
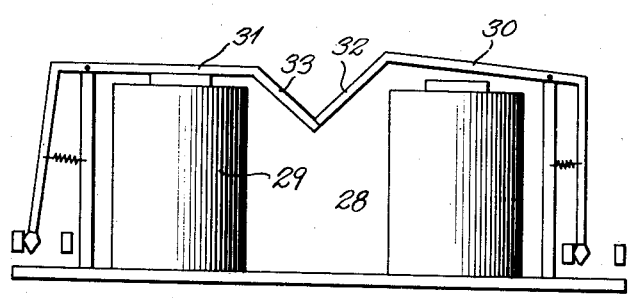
Fig. 4 is a side view showing the mechanical details of an element in Fig. 3.

The above relay is a latching relay of the type illustrated by Fig. 4. The solenoid 28 has an armature 30 while the solenoid 29 has an armature 31, both these armatures being spring biased upwardly and respectively having interlatching extensions 32 and 33. When in the position shown in Fig. 4, energization of the solenoid 28 trips off the extension 33 so that the relation of the extensions changes, the extension 33 then being on top of 32. Energization of the solenoid 29 trips the armatures back to the positions shown. One or the other of the armature extensions, is always latched over the other and is holding it down against its upward spring bias. The armature movements work the various contactors associated with them.

It is obvious now that after the solenoid 29 has been momentarily energized, the contactors 19c and 20c are as shown in Fig. 3, and tapping is proceeding. As explained, momentary energization of the solenoid 28 of the latching relay reverses the connections so that the motor 5 reverses. If this reversal is attempted while the brush 24 is on either of the segments 19a or 20a which connect with their respective field windings of the step motor through the pole changer, the control system may become confused, but if done while the brush 24 is on the segment 21a no confusion can result because the line 21b connecting this segment with its field winding pair 21 of the motor 5, does not go through the pole changer but is a direct connection. Therefore, provision is made for working the pole changer to reverse the motor 5 only during the period when the directly connected pair of windings 21 are energized, thus assuring maintenance of the necessary synchronization or phasing between the motor 5 and its rotative controlling motor 25.

Going back to Fig. 1 for a moment, the shaft 6 of the motor 5 has its upper end projecting beyond the motor and carrying a nonmagnetic disk 34 rotatively fixed to it, and on top of this disk 34 two magnetic disks 35 and 36 which are driven by the shaft 6 solely by the friction between them and between the disk 35 and the disk 34. In other words the disks 35 and 36 are driven by the shaft 6 through a slipping drive. The interengaging frictional surfaces should be carefully machined and the magnetic disks should be made of magnetically non-retentative material. A non-magnetic disk 37 may be placed over top of the magnetic disk solely as a keeper or to enhance the frictional drive to them from the motor shaft 6. The shaft 6 and spindle 7 should also be non-magnetic.

Now returning to Fig. 3, the magnetic disk 36 has a magnetic pole piece 36a which includes a radially extending arm from which arcuate pole piece extensions oppositely extend concentrically respecting the disk axis. The disk 36 also has an insulated extension carrying a bridging contactor 36b, which bridges contacts to be subsequently described.

The control system for the solenoids 28 and 29 of the previously described latching relay is powered by powering lines 38 and 39. The contacts bridged by the contactor 36b described above, are shown at 38a and 38b, they being spaced to be bridged by the contactor 36b when the step motor shaft 6 momentarily reverses, from which ever direction it is going, due to the tapping reaction exceeding its maximum torque output. These contacts should be spaced a distance equal to about half the angular distance the step motor travels during each step. Therefore, when this motor momentarily reverses, the bridging contactor 36b is frictionally shifted from the contacts 38a against which it has been biased, all by the described friction drive taken from the shaft 6, to the contacts 38b which it bridges and closes.

The motor 25 which drives the brush 24 of the step motor commutator, also drives a brush 40 over a commutator having a short segment 41 and a long segment 42, the brush 40 turning in synchronism with the brush 24 and its relation with the short segment 41 being such that the brush 40 is on it only when the brush 24 is completely on the segment 21a of the step motor commutator, the brush 40 otherwise being on the segment 42. The brush 40 is connected by a line 40a to a contactor 40b which is part of the previously described latching relay, this contactor 40b connecting the brush with the line 38 through the contacts 38a after the relay solenoid 28 has been energized to reverse the pole changer controlling the rotation of the motor 5 to reverse it, and through the contacts 38b after energization of the solenoid 29 which throws the pole changer to motor forward position. The short segment 41 connects through a line 41a with a contactor 41b which is also part of the latching relay and which shifts with the contactor 40b, this contactor 41b engaging a contact leading to the solenoid 28 when the contactor 40b connects the contacts 38b in circuit, and to a contact connecting with the solenoid 29 when the contactor 40b shifts to bring the contacts 38a into play, the other end of the windings of the solenoids 28 and 29 connecting with the power line 39.

With the above arrangement when the contactor 36b initially bridges either the contacts 38a or 38b it will energize one or the other of the latching relay solenoids only if the brush 40 is on the segment 41, and this will throw the pole changer into the reverse from whichever position it is. The latching relay solenoids are energized only momentarily because as soon as the latching relay operates, the contactor 41b breaks the circuit to its operating solenoid, and the contactor 40b breaks the circuit just closed by the contactor 36b making the contactor 36b inoperative in the direction of its last instantaneous contact.

It is now obvious that with each momentary reversal of the step motor due to its being overloaded, its pole changer is thrown to reverse position so that it continues to reversely operate, the extent of this reverse operation being controlled as will presently be described. The pole changer can operate only when the brush 24 is on the segment 21a directly connecting with the step motor without going through the pole changer, whereby proper phase control is maintained.

Should overloading of the step motor occur when the brush 24 is on any other than the directly connected segment 21a, the latching relay will not work to throw its pole changing contacts, as will now be explained.

One arcuate extension of the pole piece 36a works as an armature in a solenoid 43 having one end of its winding connecting with the power line 39 and its other end connecting through a line 43a, with a contact engaged by a contactor 42a of the latching relay, which works in synchronism with the other contactors 40b and 41b, which connects with the long segment 42 over which the brush 40 works whenever the brush 24 is other than squarely on the segment 21a of the step motor commutator. Therefore, when the contactor 36b bridges the contacts 38b due to momentary reversal of the motor 5, and connects the brush 40 through the long segment 42 with the line 38, this brush energizes the solenoid 43 which then magnetically pulls on the arcuate pole piece working in it and magnetically holds the contactor 36b against the contacts 38b until the brush 40 rides onto the short segment 41 and reverses the step motor. The just previously described arrangement prevents any re-reversal of the step motor from breaking the contact made by contactor 36b and assures proper phasing at the moment of reversal.

With the motor reversed as described above, the contactor 36b is held against the contacts 38b by the frictional drive of the disk 36, but these contacts 38b are then out of circuit with everything because the contactors 40b, 41b and 42a are away from their contacts which they previously contacted.

The other and lower magnetic disk 35 is also being frictionally driven reversely and it insulatingly carries a bridging contactor 35a. This contactor works between more widely spaced contacts 38c and 38d. When this bridging contactor 35a bridges the contacts 38d, due to its reverse frictional driving, it closes the circuit through a solenoid 44 in which the other arcuate extension of the pole piece 36a works as an armature. This circuit is from the line 38 through the bridging contactor 35a and bridged contacts 38d, and line 44a to the solenoid 44. Upon energization of this solenoid 44, the disk 36 is pulled opposite the reversing direction of the motor shaft 6, to cause its contactor 36b to bridge the contacts 38a which thus gets current to the contactor 40b going to the brush 40, the contacts 40b, 41b and 42a being all on the right hand contacts in Fig. 3 at this time. When the step motor is driving in reverse, the contacts 38b function in a similar manner to control the extent of reversal due to the torque being exceeded, these contacts connecting with the solenoid 43. Again, if the brush 40 is on the short segment 41 the latching relay is thrown by momentary energization of its solenoid 29; otherwise the solenoid 44 is held energized by a line 44b going to a contact now engaged by the contactor 42a connecting with the long segment 42, this prevailing until the brush 40 rides onto the short segment 41. The actions described are repeated whenever the tapping operations offer too much resistance.

Due to the relation of the disks 35 and 36, energization of the solenoid 44 magnetizes the disk 36 so that when it is turned by this solenoid 44 it also turns the disk 35 with it, thus pulling the bridging contactor 35a from its contacts 38d. This simultaneous motion occurs whenever either of the solenoids 43 or 44 are energized, and is relied upon to get the contactor 35a off its bridged contacts almost immediately after it establishes a circuit.

The reversing revolving of the stop motor shaft 6 is fixed, in extent, by the angular relation of the contacts 38c and 38d respecting axis of the disk 35. Almost a full revolution reversal is potentially possible with the arrangement shown, by arranging these contacts closely back to back. Any practical amount of reversal may be effected by using a gear reduction between the disk 34 and the spindle 6, or by incorporating a time delay relay in the electrical system.

All of the features that have been described, prevail during any reversal required for chip clearance. If the tap torque exceeds the fixed maximum during reversal, the rotating pole pieces of the step motor 5 stall, almost immediately flip in what is a forward direction in such an event, and cause the contactor 36b to close the circuit through the contacts 38a, thus causing the tap to be turned forwardly again. It follows that when the tap jams in the hole it is immediately reversed, and if it re-jams, it again stalls and immediately starts forward. The system's return to forward drive is dependent on either the contacts 38d, or upon the tap turning torque being greater than the torque which the step motor can produce. Obviously the tap is worked in a manner equalling that of a manually skilled machinist, the action being equally delicate but more rapid and entirely independent of operator fatigue.

Returning again to Fig. 1, the column 2 has a second bracket 45 adjustably clamped to it, by operation of a handle 46, above the bracket 3. This bracket 45 mounts a reciprocating rod 47 carrying an arm system 48 working the push-buttons of a latching microswitch 49. Such switches are commercially available and work to close a circuit when one button is pushed and open the circuit when the other button is pushed. Here the arrangement is so that when the rod 47 is moved downwardly it opens the switch, while upward movement of the rod closes the switch.

This rod 47 has vertically spaced abutments 50 engaged by a trip 51 fixed to the post 12, at least one of the abutments 50 being adjustable, on the rod 47 so that in conjunction with the adjustment of the bracket 45 the arrangement can be set to open the switch 49 when the tap reaches its downward working limit and to close the switch 49 when the tap reaches its upward limit plus a distance needed to move the work for tapping of another hole in either the same or another work piece. The microswitch and its working elements may be carried by the bracket 3 if desired, with suitable adjustability provided by making both abutments 50 adjustable, for example.

The line 39 connects through this switch 49 with the solenoid 52 of a relay, the line 38 connecting with the other end of this solenoid. As long as this relay solenoid 52 is energized it holds two contactors 39a against contacts connecting a branch 39b of this line, with a solenoid 53 the other end of which connects with the line 38.

As shown by Figs. 1 and 2, this solenoid 53 works an armature 54 which pulls on a torsion spring 55 coiled around a drum 56 secured to the shaft 13. This places torque on the shaft 13 counter to the torque exerted by the spring 16 and overcoming it. This causes the weight of the various parts to drop the spindle 7 so the tap enters the hole in the work, after which the feed is largely, if not entirely, created by the screw action of the tap. When the trip 51 works the lower abutment 50 to open the switch 49, the relay solenoid 52 is de-energized so that the contactors 39a open the circuit through the line 39b to the solenoid 53, de-energizing the latter so that the spring 16 is again available to apply its lifting force to the spindle 7.

A special feature of the above drive, as compared to certain other commonly used drives for tapping machines, is the fact that no axial strain on the tap is required to operate the drive. This prevents any stretching or tearing of the threads near the entrance to the tapped hole and assists in tapping precision threads.

When the motor 5 reverses because its maximum torque output is exceeded it is also desirable to deenergize the solenoid 53. This is done by a contactor 39c which works with the pole changing or reversing contactors 19c and 20c to open the circuit through the line 39b during such reversals, this line going through this contactor 39c.

The contact sets 38c and 38d connect with the solenoids 43 and 44 which they respectively control, through contactors 52c and 52d which shift with the contactors 39a, upon energization of the relay solenoid 52. They control the final continuous direction of rotation of the step motor 5. When the circuits to contacts 38c are open this direction will be clockwise as shown in Fig. 3. Contacts 38c are then inoperative while contacts 38d are operative and will function to limit the amount of reversal initiated by a magnetic slippage of step motor 5. Deenergization of solenoid 52 shifts the contact 52c making contacts 38c operative and shifts contact 52d making contacts 38d inoperative so the final direction of the step motor 5 becomes counterclockwise and the tap unscrews itself from the tapped hole. During this unscrewing, all the advantages previously described are retained. As the spring 16 lifts the spindle and its mounting after the tap frees itself from the work, the trip 51 works the upper abutment 50 to reclose the switch 49 so the system again starts to operate as before. It is assumed that automatic means for shifting the work will be used, during this brief interval, to shift the workpiece or to replace it with another workpiece, thus providing another hole for tapping.

A switch 57 provides for by-passing the switch 49 and substituting for it a manually operated push button 58 which closes the circuit to the solenoid 52 when pushed and opens it when its push button is released. This switch should be on the end of a flexible cord so the machine operator can hold it in his hand while arranging his work, or it may be provided with a treadle for operation by the operator's foot. In either event the operator's hands are left comparatively free for holding or arranging the work.

In rare instances it is necessary to tap a left-hand thread, so the invention provides a pole changer 59 which reverses the polarity of the entire system so it operates reversely throughout. Therefore, the contactor 39c, which works with the pole changing contacts 19c and 20c and controls the line 39b, has two contacts and requires the provision of two contactors 39a which work together, these contactors 39a being controlled by the pole changer 59 so that the proper one only is operative to send the circuit through the one of the contacts for the contactor 39c which will open for reverse tap rotation. A further optional method of reversing the system is by reversing the direction of the motor 25.

I claim:

1. A machine for working a rotative tool requiring momentary rotation reversal when its working torque becomes excessive, said machine including a tool chuck turned by an electric motor having stationary and rotative sets of magnetic pole pieces with one set thereof magnetized by solenoids having separate electric powering circuits for successive electric powering thereof and successive magnetizing of the pole pieces of said set, with the pole pieces of said sets relatively spaced for rotation of said rotative set upon said successive powering and in phase therewith, and an electric circuit controller for effecting said successive powering of said circuits, said rotative pole pieces being adapted to momentarily reverse toward the nearest magnetized pole pieces of said set magnetized by said solenoids when tool overloading throws said rotative set out of phase with said successive electric powering, said circuit including a pole-changer for reversing the direction of said successive powering and said machine including a controller for said pole-changer and which is operatively responsive to said momentary reversal and to a predetermined amount of reversal of said rotative pole pieces for reversing said pole-changer in both instances.

2. A machine for working a rotative tool requiring momentary rotation reversal when its working torque becomes excessive, said machine including a tool chuck turned by an electric motor having stationary and rotative sets of magnetic pole pieces with one set thereof magnetized by solenoids having separate electric powering circuits for successive electric powering thereof and successive magnetizing of the pole pieces of said set, with the pole pieces of said sets relatively spaced for rotation of said rotative set upon said successive powering and in phase therewith, and an electric circuit controller for effecting said successive powering of said circuits, said rotative pole pieces being adapted to momentarily reverse toward the nearest magnetized pole pieces of said set magnetized by said solenoids when tool overloading throws said rotative set out of phase with said successive electric powering, said circuit including a pole-changer for reversing the direction of said successive powering and said machine including a controller for said pole-changer and which is operatively responsive to said momentary reversal and to a predetermined amount of reversal of said rotative pole pieces for reversing said pole-changer in both instances, said pole-changer being electromagnetically operated and said controller including a power-controlling circuit for said pole-changer including spaced limit switches operated by limited rotation of said rotative pole pieces and a pole-changer for said power-controlling circuit for reversing said power-controlling circuit and rendering said limit switches reversely operative.

3. A tapping machine including a tap chuck, a step motor with its power shaft connecting with said chuck, a commutator with one segment in direct circuit with one winding of said motor and its remainder in circuit with the remaining windings through a pole-changer and having a brush working on said segments for rotatively successively powering said windings and operating said motor in either rotative direction under control of said pole-changer, a motor for driving said brush, power lines connecting with said brush and windings, a controller for said pole-changer and which is operatively responsive to momentary reversal of said power shaft, and a system for limiting operation of said pole-changer under the control of said controller to operation only when said brush is on said direct circuited segment.

4. A tapping machine including a tap chuck, a step motor with its power shaft connecting with said chuck, a commutator with one segment in direct circuit with one winding of said motor and its remainder in circuit with the remaining windings through a pole-changer and having a brush working on said segments for rotatively successively powering said windings and operating said motor in either rotative direction under control of said pole-changer, a motor for driving said brush, power lines connecting with said brush and windings, said pole-changer being electrically controlled and having separate controlling circuits respectively for throwing it in opposite directions, at least two magnetic elements moved by said power shaft through a slipping drive, one of said elements closing a contact set controlling one of said controlling circuits when moved by momentary reversal of said power shaft and being in the magnetic field of a solenoid for holding it, closing said contact set when the solenoid is energized, and a second solenoid for pulling it to open said contact set when said second solenoid is energized, the other of said elements closing a contact set controlling the other of said controlling circuits when moved by reverse rotation of said power shaft a predetermined amount, a second commutator having a brush synchronized to work on a short segment of the second commutator when the first-named brush is on said direct circuited segment of the first commutator and on a long segment when the first-named brush is on the other segments of the first-named commutator, a circuit energizing the first-named solenoid through the first-named contact set of the first-named element and the brush and long segment of the second-named commutator, the pole-changer controlling circuits both working through said short segment and brush of the second-named commutator and brush, and a switch system for opening the circuits to said solenoids and responsive to operation of said pole-changer.

5. A tapping machine including a step motor with its power shaft directly coupled to a tap chuck to keep rotative mass to a minimum, tap torque above that which the motor can deliver causing momentary reversal of said shaft for chip clearance and at least two magnetic material disks being rotatively connected with said shaft through a slipping drive, one of said disks working contacts controlling a switch for reversing the motor's magnetic field upon said momentary reversal and one of said disks having pole pieces and solenoids for oppositely turning it with a system limiting operation of said switch until a predetermined winding of said motor is energized and for energizing one of said solenoids upon said contacts while other windings of said motor are energized, the other of said disks working contacts also but oppositely controlling said switch through said system and for energizing the other of said solenoids as described, magnetic flux between said disks causing them to turn together when the first-named disk is turned by energization of said solenoids.

6. An electric switching system for a rotative shaft, comprising a friction drive from said shaft to a plurality of frictionally interdriven magnetic metal members working switching elements with at least one element having electromagnetic direction shifting means inducing magnetic flux therein and another of the elements being locked thereto by said flux for receiving therefrom the magnetic shifting force from said electromagnetic means.

FRANCIS S. SINCLAIRE.

REFERENCES CITED

The following references are of record in the file of this patent:

UNITED STATES PATENTS

| Number | Name | Date |
|---|---|---|
| 1,113,289 | Barnum | Oct. 13, 1914 |
| 1,831,735 | Blum | Nov. 10, 1931 |
| 1,991,927 | Herrmann | Feb. 19, 1935 |
| 2,209,368 | Whittaker | July 30, 1940 |
| 2,417,528 | Cate | Mar. 18, 1947 |
| 2,443,623 | Koenig | June 22, 1948 |

FOREIGN PATENTS

| Number | Country | Date |
|---|---|---|
| 361,515 | Germany | Oct. 16, 1922 |
| 588,987 | Germany | Nov. 30, 1933 |